United States Patent
Pourahmadi et al.

(10) Patent No.: US 10,075,954 B2
(45) Date of Patent: Sep. 11, 2018

(54) SYSTEMS AND METHODS FOR BAND-LIMITED SUBFRAMES IN WIRELESS NETWORKS

(71) Applicant: BlackBerry Limited, Waterloo (CA)

(72) Inventors: Vahid Pourahmadi, Ottawa (CA); Yongkang Jia, Ottawa (CA); Yi Song, Plano, TX (US); Siva Dharshan Muruganathan, Stittsville (CA); Yufei Wu Blankenship, Kildeer, IL (US); Hua Xu, Ottawa (CA); Robert Mark Harrison, Grapevine, TX (US); Shiwei Gao, Nepean (CA); Masoud Ebrahimi Tazeh Mahalleh, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 94 days.

(21) Appl. No.: 14/033,104

(22) Filed: Sep. 20, 2013

(65) Prior Publication Data

US 2015/0085677 A1    Mar. 26, 2015

(51) Int. Cl.
*H04W 72/04* (2009.01)
*H04W 52/04* (2009.01)
(Continued)

(52) U.S. Cl.
CPC ....... *H04W 72/0453* (2013.01); *H04L 5/0035* (2013.01); *H04L 5/0041* (2013.01);
(Continued)

(58) Field of Classification Search
None
See application file for complete search history.

(56) References Cited

U.S. PATENT DOCUMENTS

| | | | |
|---|---|---|---|
| 2008/0186919 A1* | 8/2008 | Huang et al. | 370/331 |
| 2009/0185577 A1* | 7/2009 | Kishiyama | H04L 1/0003 370/465 |

(Continued)

FOREIGN PATENT DOCUMENTS

| | | |
|---|---|---|
| EP | 2533595 A1 | 12/2012 |
| WO | 2008035171 | 3/2008 |
| WO | 2009158546 | 12/2009 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 v11.2.0 (Sep. 2012); 136 pages.

(Continued)

*Primary Examiner* — Noel R Beharry
*Assistant Examiner* — Ruihua Zhang
(74) *Attorney, Agent, or Firm* — Fish & Richardson P.C.

(57) ABSTRACT

Systems, methods, and apparatuses for using band-limited subframes in wireless communication networks are provided. During the band-limited subframes, the macro cell base station may mute its transmission or transmit at a low power over some frequency sub-band, while transmitting at a normal or higher power over other frequency sub-band. Correspondingly, the small cell base station may communicate with UEs within its coverage at the frequency sub-band that the macro cell base station transmits at a low power. The band-limited subframe enables the small cell base station to communicate with the UE with reduced interference, and in the meantime, increases the throughput of macro cell base station as it does not require the macro cell base station to completely mute its transmission during the band-limited subframe.

21 Claims, 10 Drawing Sheets

(51) Int. Cl.

| | |
|---|---|
| *H04L 5/00* | (2006.01) |
| *H04W 16/10* | (2009.01) |
| *H04W 52/14* | (2009.01) |
| *H04W 52/24* | (2009.01) |
| *H04W 52/28* | (2009.01) |
| *H04W 52/44* | (2009.01) |
| *H04W 84/04* | (2009.01) |
| *H04W 16/32* | (2009.01) |

(52) U.S. Cl.
CPC .......... *H04L 5/0073* (2013.01); *H04L 5/0092* (2013.01); *H04W 16/10* (2013.01); *H04W 52/04* (2013.01); *H04W 52/143* (2013.01); *H04W 52/244* (2013.01); *H04W 52/247* (2013.01); *H04W 52/281* (2013.01); *H04W 52/44* (2013.01); *H04W 16/32* (2013.01); *H04W 84/045* (2013.01)

(56) References Cited

U.S. PATENT DOCUMENTS

| | | | | |
|---|---|---|---|---|
| 2012/0014333 | A1* | 1/2012 | Ji et al. .................. | 370/329 |
| 2012/0033624 | A1* | 2/2012 | Luo et al. ............... | 370/329 |
| 2012/0190365 | A1* | 7/2012 | Jeong et al. ............ | 455/436 |
| 2012/0213137 | A1* | 8/2012 | Jeong et al. ............ | 370/311 |
| 2012/0213189 | A1* | 8/2012 | Choi ............. | H04W 72/1231 370/329 |
| 2013/0107827 | A1* | 5/2013 | Dinan .................... | 370/329 |
| 2013/0121191 | A1 | 5/2013 | Song et al. | |
| 2013/0142288 | A1 | 6/2013 | Dinan | |
| 2013/0172001 | A1* | 7/2013 | Gerlach ........... | H04W 16/32 455/450 |
| 2013/0235743 | A1* | 9/2013 | Goldhamer ............ | 370/252 |
| 2013/0294383 | A1* | 11/2013 | Zhang et al. .......... | 370/329 |
| 2014/0094181 | A1* | 4/2014 | Kakinada et al. ..... | 455/446 |
| 2014/0341093 | A1* | 11/2014 | Seo ............... | H04W 52/143 370/280 |
| 2016/0007347 | A1* | 1/2016 | Nagata ............. | H04W 16/30 370/280 |

OTHER PUBLICATIONS

"3rd Generation Partnership Project; Technical Specification Group Radio Access Network; Coordinated multi-point operation for LTE physical layer aspects (Release 11)"; 3GPP TR 36.819 v11.1.0 (Dec. 2011); 69 pages.

"LTE; Evolved Universal Terrestrial Radio Access (E-UTRA); Physical layer procedures (3GPP TS 36.213 version 11.0.0 Release 11)", ETSI TS 136 213 v11.0.0 (Oct. 2012), 144 pages.

"LTE; Evolved Universal Terrestrial Radio Access (E-UTRA); Radio Resource Control (RRC); Protocol specification (3GPP TS 36.331 version 11.3.0 Release 11)", ETSI TS 136 331 v11.3.0 (Apr. 2013), 347 pages.

"LTE; Evolved Universal Terrestrial Radio Access (E-UTRA); Radio Frequency (RF) system scenarios (3GPP TR 36.942 version 11.0.0 Release 11)", ETSI TR 136 942 v11.0.0 (Oct. 2012), 110 pages.

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.3.0.(Sep. 2011), 103 pages.

"LTE; Evolved Universal Terrestrial Radio Access (E-UTRA); Base Station (BS) radio transmission and reception (3GPP TS 36.104 version 10.2.0 Release 10)", ETSI TS 136 104 v10.2.0 (May 2011), 102 pages.

"Study on CoMP for LTE with Non-Ideal Backhaul", RP-130714; 3GPP TSG RAN Meeting #60, Oranjestad, Aruba, Jun. 11-14, 2013, 5 pages.

Extended European Search Report in European Application No. 14185654.2, dated Feb. 4, 2015, 7 pages.

Communication Pursuant to Article 94(3) EPC issued in European Application No. 14185654.2 on May 31, 2016.

Communication Pursuant to Article 94(3) EPC issued in European Application No. 14185654.2 on Oct. 26, 2016.

Communication Pursuant to Article 94(3) EPC issued in European Application No. 14185654.2 on Mar. 24, 2017.

Invitation Pursuant to Article 94(3) and Rule 71(1) EPC issued in European Application No. 14185654.2 on Aug. 31, 2017; 4 pages.

\* cited by examiner

SYSTEMS AND METHODS FOR BAND-LIMITED SUBFRAMES IN WIRELESS NETWORKS

TECHNICAL FIELD

The present disclosure generally relates to wireless networks, and more particularly, to systems and methods for band-limited subframes in wireless networks.

BACKGROUND

Cellular wireless networks such as a UMTS Terrestrial Radio Access Network (UTRAN) and an Evolved Universal Terrestrial Radio Access Network (E-UTRAN), deploy cells capable of covering different size areas to improve cell coverage or to enhance throughput. Small cells (e.g., pico cells, relay cells, or femto cells) cover small areas and overlay large cells (also known as macro-cells) that cover larger areas. A network including macro cells and small cells is referred to as a heterogeneous wireless communication network or, for simplicity, as a heterogeneous network.

Macro-cells and small cells may operate in the same or different carrier frequencies. Operating the macro-cells and small cells on the same frequency generates cell splitting gain and, thus, increases system capacity. On the other hand, operating the macro-cells and small cells on the same carrier frequency increases the interference among cells.

SUMMARY

Consistent with disclosed embodiments, there is provided a method for a first network node. The method comprises transmitting over a first frequency sub-band with a first transmission power during a set of subframes, wherein the set of subframes is a subset of one or more radio frames, and the first transmission power is above a first threshold, and transmitting over a second frequency sub-band during the set of subframes with a second transmission power, wherein the second transmission power is below a second threshold. The method may further comprise the first network node sending information of the set of subframes to a second network node. The method may also comprise the first network node sending information of at least one of the first and the second frequency sub-bands to the second network node. The first network node may send the information of the set of subframes and the information of the first and second frequency sub-bands in a Load Information message to the second network node. Additionally, the method may comprise receiving or transmitting control signaling from the second base station. The second network node may refrain from transmitting data over the first frequency sub-band during the set of subframes. The second network node may transmit with low power over the first frequency sub-band during the set of subframes. The second network node may transmit with normal or high power over the second frequency sub-band during the set of subframes. The first network node may be a macro cell network node, and the second network node may be a small cell network node. The first network node and the second network node may also be both small cell network nodes. The second frequency sub-band and the first frequency sub-band may be separated by a guard band. The guard band may be pre-configured or semi-statically configured by the first network node. The second transmission power may be zero. The network node may transmit control information in a physical downlink shared channel (PDSCH) region of the first frequency sub-band during the set of subframes. Additionally, the method may comprise sending at least one of information of the set of subframes, information of the first frequency sub-band, and information of the second frequency sub-band, to a user equipment.

Consistent with disclosed embodiments, there is provided a method for a user equipment (UE). The method comprises receiving a message from a network node, wherein the message indicates a configuration of a set of subframes, and a first subband and a second subband are configured associated with the set of subframes, performing measurements based on the configuration of the set of subframes, and sending measurement information associated with the set of subframes to the network node. The network node may transmit over the first frequency sub-band with a first transmission power and transmit over the second frequency sub-band with a second transmission power during the set of subframes. The message may further indicate information of the first and second frequency sub-bands. The UE may receive the message in a radio resource control (RRC) message. The method may further comprise sending channel quality information (CQI) associated with a plurality of frequency sub-bands within the set of subframes to the network node. The measurement information may include a plurality of measurements associated with a plurality of frequency sub-bands. The measurement information may include a single measurement associated with an entire frequency band. The method may further comprise receiving data from the network node during at least one of the set of subframes. The UE may receive control information associated with the data in a physical downlink shared channel (PDSCH) region.

Consistent with disclosed embodiments, there is also provided a network node configured to transmit over a first frequency sub-band with a first transmission power during a set of subframes, wherein the set of subframes is a subset of one or more radio frames, and the first transmission power is above a first threshold, and transmit over a second frequency sub-band during the set of subframes with a second transmission power, wherein the second transmission power is below a second threshold.

Consistent with disclosed embodiments, there is also provided user equipment configured to receive a message from a network node, wherein the message indicates a configuration of a set of subframes, and a first subband and a second subband are configured associated with the set of subframes, perform measurements based on the configuration of the set of subframes, and send measurement information associated with the set of subframes to the network node.

It is to be understood that both the foregoing general description and the following detailed description are representative and explanatory only and are not restrictive of the claimed invention.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure relates to systems, methods, and apparatuses for using band-limited subframes in wireless communication networks. In a heterogeneous wireless network containing both a macro cell and a small cell operating on the same frequency band, the transmission of the macro cell generates interferences to the user equipment (UE) within the small cell coverage. To reduce this interference, an almost blank subframe (ABS) is used to facilitate the communication between the small cell base station and the UE in its coverage. During the ABS, the macro cell base station mutes its transmission or transmits at a low power such that the interference to the small cell UE is minimized. The use of almost blank subframe reduces the macro cell throughput because, for example, the macro cell base station blanks its transmission during these subframes.

To balance between system throughput and interference control, a band-limited subframe may be used in wireless networks. During the band-limited subframe, the macro cell base station blanks its transmission or transmits at a low power in some frequency sub-band while maintains its transmission in other frequency sub-band at a normal power or high power. Correspondingly, the small cell base station may communicate with UEs over the frequency sub-band that the macro cell base station transmits at a low power with reduced interference. To facilitate intelligent scheduling over these band-limited subframes, the UE may perform separate measurements over the configured band-limited subframes and report the measurement information to its serving base station. The band-limited subframes or a subset of the band-limited subframes may be pre-configured and signaled to the UE. In addition, the macro cell base station may inform the small cell base station the configuration of band-limited subframes and the low power frequency sub-band over a communication service such as a backhaul link.

Reference will now be made in detail to the example embodiments implemented according to the disclosure; the examples are illustrated in the accompanying drawings. Wherever possible, the same reference numbers will be used throughout the drawings to refer to the same or like parts.

Figure 1:
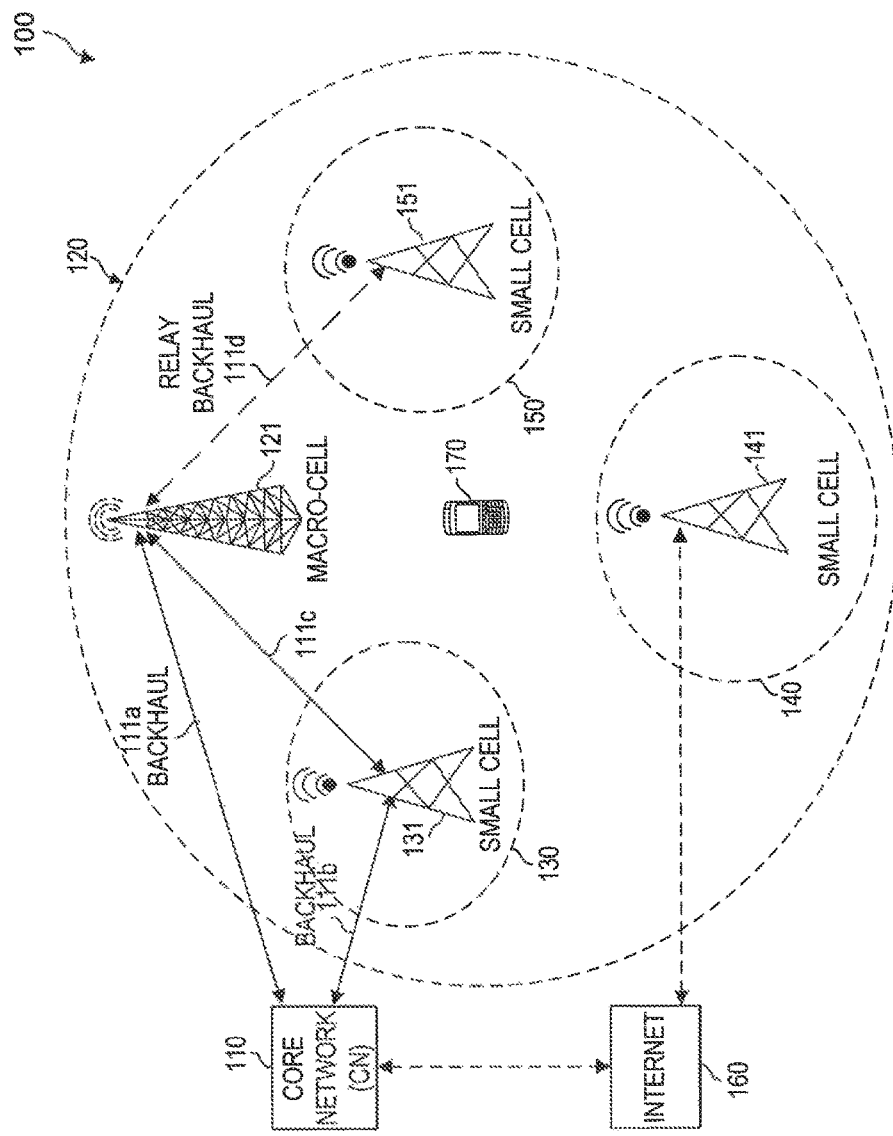
FIG. 1 illustrates an example E-UTRAN wireless communication network for implementing methods and systems consistent with the present disclosure.

FIG. 1 illustrates an example E-UTRAN wireless communication network 100 in which systems and methods consistent with this disclosure may be implemented. The illustrated wireless communication network 100 includes a core network 110 and a macro-cell or overlay cell 120. The term "cell" or "wireless cell" generally refers to an area of coverage of wireless transmission by a network or network component. A wireless cell generally includes an access node which provides wireless service to user equipments located within or near the cell coverage area. The core network 110 is, in some implementations, connected to a data network such as Internet 160.

The illustrated implementation includes macro-cell 120 and a set of small cells 130, 140 and 150. The macro-cell 120 includes at least one base station (BS), a term that can be interchangeably used with a network node, an access node, or a network component. Two or more base stations may operate on the same radio frequency or on different radio frequencies. The base station is, in some implementations, an overlay access node 121, which is connected to the core network 110 via a backhaul link 111a, including optical fiber or cable. The overlay access node 121 may also be referred to as a "macro node" or a "macro-eNB." The backhaul link between the macro-eNB and the core network is referred to as an S1 interface. The term "overlay access node" generally refers to a network element or component that at least partly serves to form a wireless cell. In one implementation in which the network 100 is a long term evolution (LTE) network, the overlay access node 121 can be a Universal Terrestrial Radio Access Network (UTRAN) node B or "eNB" which is part of an evolved Universal Terrestrial Radio Access Network (E-UTRAN).

The network 100 also includes, in some implementations, one or more small cells 130, 140, and 150. The small cells are served by low power nodes, where the low power nodes can be for example, a pica cell, a femto cell, a relay cell, or other types of small cell nodes. In some implementations, the small cells have a coverage at least partially overlapping with the coverage of the macro-cell 120. While the term "small cell" is described herein in the context of LTE, the implementations described herein can be adapted for other wireless standards that have components similar to small cells, such as cellular telecommunication systems such as Global System for Mobile Communication (GSM) protocols, Universal Mobile Telecommunications System (UMTS), IEEE 802.11 Wireless Local Area Network (WLAN), and IEEE 802.16 WiMAX, which may also include cells such as pico/femto cells.

Although FIG. 1 illustrates one macro-cell and three small cells, the network 100 can include more or less of such cell types. Further the small cells may be sparsely or densely deployed. The small cells 130, 140 have a smaller coverage than the macro-cell 120. For example, in a suburban environment, the macro-cell 120 may have a coverage radius of approximately 0.5 kilometer, while the small cells 130, 140 may have a coverage radius of approximately 0.2 kilometer.

Access nodes 131, 141 of the small cells 130, 140 use a lower transmission power than that of the macro-eNB 121. The small cells 130, 140 may further include a range expansion area used for increasing the coverage area for the cells having a smaller coverage. The access nodes of the small cells may also be referred as low power nodes or low power eNBs.

The small cell 130, for example, may be an enhanced pico cell that includes a pico eNB 131 connected to a core network (CN) 110 via a backhaul link 111*b* and to a macro node, such as the macro-eNB 121, via a backhaul link 111*c*. The backhaul link between the macro-eNB and the pico eNB is referred to as an X2 interface. The backhaul links 111*b* and 111*c* include, for example, cable, fiber, and wireless links. In some implementations, the pico eNB 131 can have a transmission power that is, for example, about 30 dBm, which is about 13 to 16 dB lower than the transmission power of the macro-eNB 121, which may be about 43 to 46 dBm.

The small cell 140, for example, may be an enhanced femto cell that includes a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro-eNB 121 can be referred to as a source eNB. In some implementations, the femto eNB 141 can have a transmission power that is, for example, about 20 dBm, which is about 23 to 26 dB lower than that of the macro-eNB 121.

The network 100 also includes, in some implementations, a small cell node 151 that, for example, serves to wirelessly relay data and/or control information between the macro-eNB 121 and user equipment 170. In this circumstance, the small cell node 151 may also be referred to as a relay node. The macro-eNB 121 and the relay node 151 are connected to each other via a wireless backhaul link 111*d*. In such an instance, the macro-eNB 121 is referred to as a "donor eNB." In some implementations, the relay node 151 has a transmission power that is, for example, about 30 or 37 dBm, which is about 13 dB or 6 dB lower than that of the macro-eNB 121. Example variations of small cell access nodes include pico eNBs, femto eNBs, relay nodes, or SeNBs dedicated to data offloading.

The CN 110 in this embodiment is a backbone network, which may be considered a central part of the telecommunications system. In certain implementations, evolved packet core (EPC) serves as a main component of the CN 110. The CN 110 can include a mobility management entity (MME), a serving gateway (SGW), and a packet data network gateway (PGW). The MME is a main control element in the CN 110, and it is responsible for the functionalities comprising the control plane functions related to subscriber and session management. The SGW serves as a local mobility anchor such that the packets are routed through this point for intra EUTRAN mobility and mobility with other legacy 2G/3G systems. The SGW functions may include user plane tunnel management and switching. The PGW provides connectivity to a services domain comprising external networks, such as IP networks.

The UE 170 communicates wirelessly with the macro-eNB 121 or the small cell eNBs 131, 141, 151, depending on the location or the existence of subscription in the case of the femto cell 140. The term "user equipment," alternatively "UE," refers to various devices with telecommunications capabilities, such as mobile devices and network appliances.

Examples of user equipment (UE) include, but are not limited to, a mobile phone, a smart phone, a telephone, a television, a remote controller, a set-top box, a computer monitor, a computer (including a tablet computer such as BlackBerry® Playbook tablet, a desktop computer, a hand-held or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 includes a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 includes the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
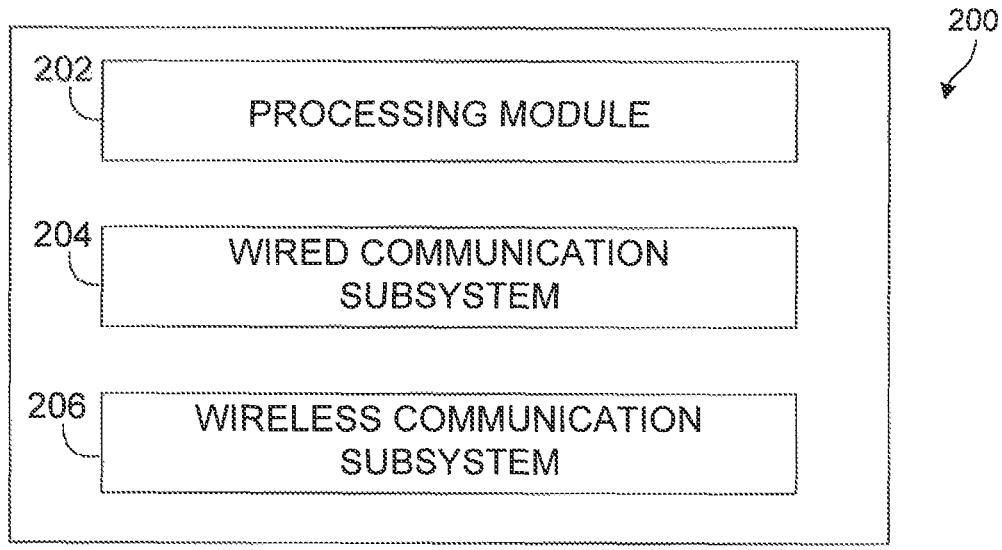
FIG. 2 illustrates an example access node device, in accordance with an embodiment of the present disclosure.

FIG. 2 illustrates components of an example access node device 200 consistent with certain aspects of this disclosure. The example access node device 200 includes a processing module 202, a wired communication subsystem 204, and a wireless communication subsystem 206. The processing module 202 includes one or more processing components (alternatively referred to as "processors" or "central processing units" (CPUs)) operable to execute instructions related to one or more of the processes, steps, or actions described in connection with one or more of the embodiments disclosed herein. The processing module 202 also includes other auxiliary components, such as random access memory (RAM), read only memory (ROM), secondary storage (for example, a hard disk drive or flash memory). Additionally, the processing module 202 executes certain instructions and commands to provide wireless or wired communication, using the wired communication subsystem 204 or a wireless communication subsystem 206. One skilled in the art will readily appreciate that various other components can also be included in the example access node device 200.

Figure 3:
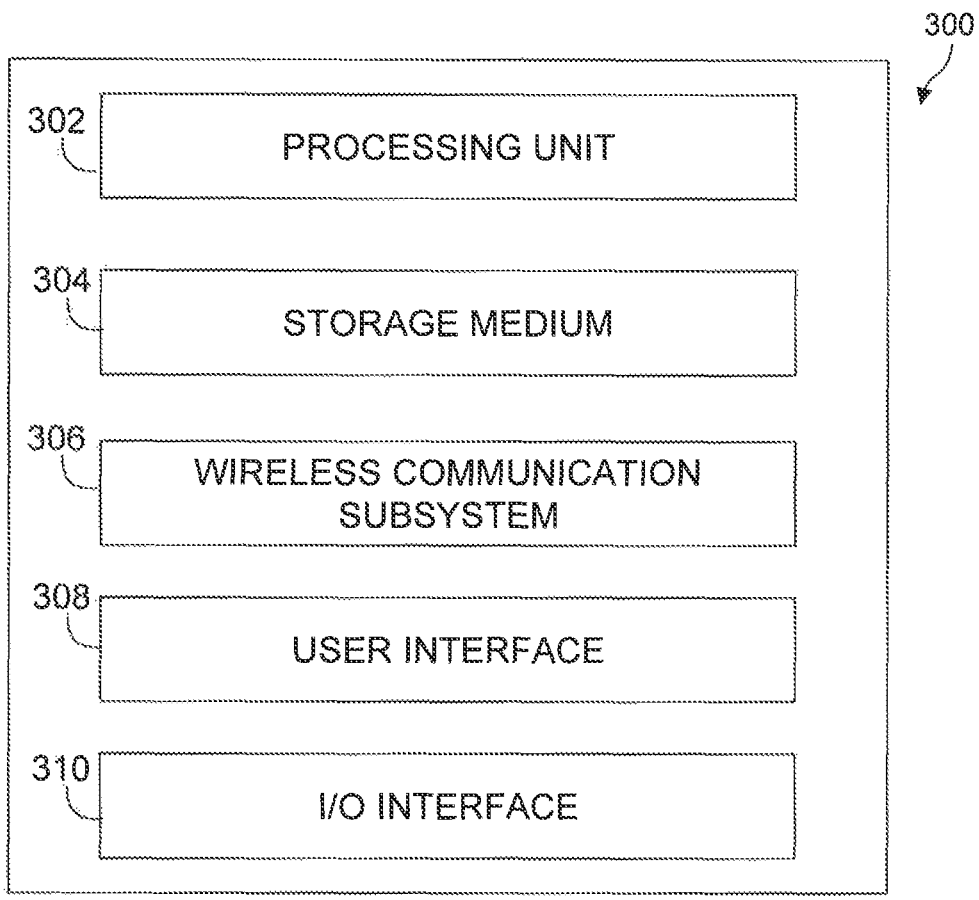
FIG. 3 illustrates an example user equipment device, in accordance with an embodiment of the present disclosure.

FIG. 3 illustrates components of an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 includes components and performs functions similar to the processing module 302 described with regard to FIG. 2. The wireless communication subsystem 306 is configured to provide wireless communications for data information or control information provided by the processing unit 302. The wireless communication subsystem 306 includes, for example, one or more antennas, a receiver, a transmitter, a local oscillator, a mixer, and a digital signal processing (DSP) unit. In some implementations, the wireless communication subsystem 306 can support MIMO transmissions.

The user interface 308 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 includes, for example, a universal serial bus (USB) interface. One skilled in the art will readily appreciate that various other components can also be included in the example UE device 300.

Figure 4:
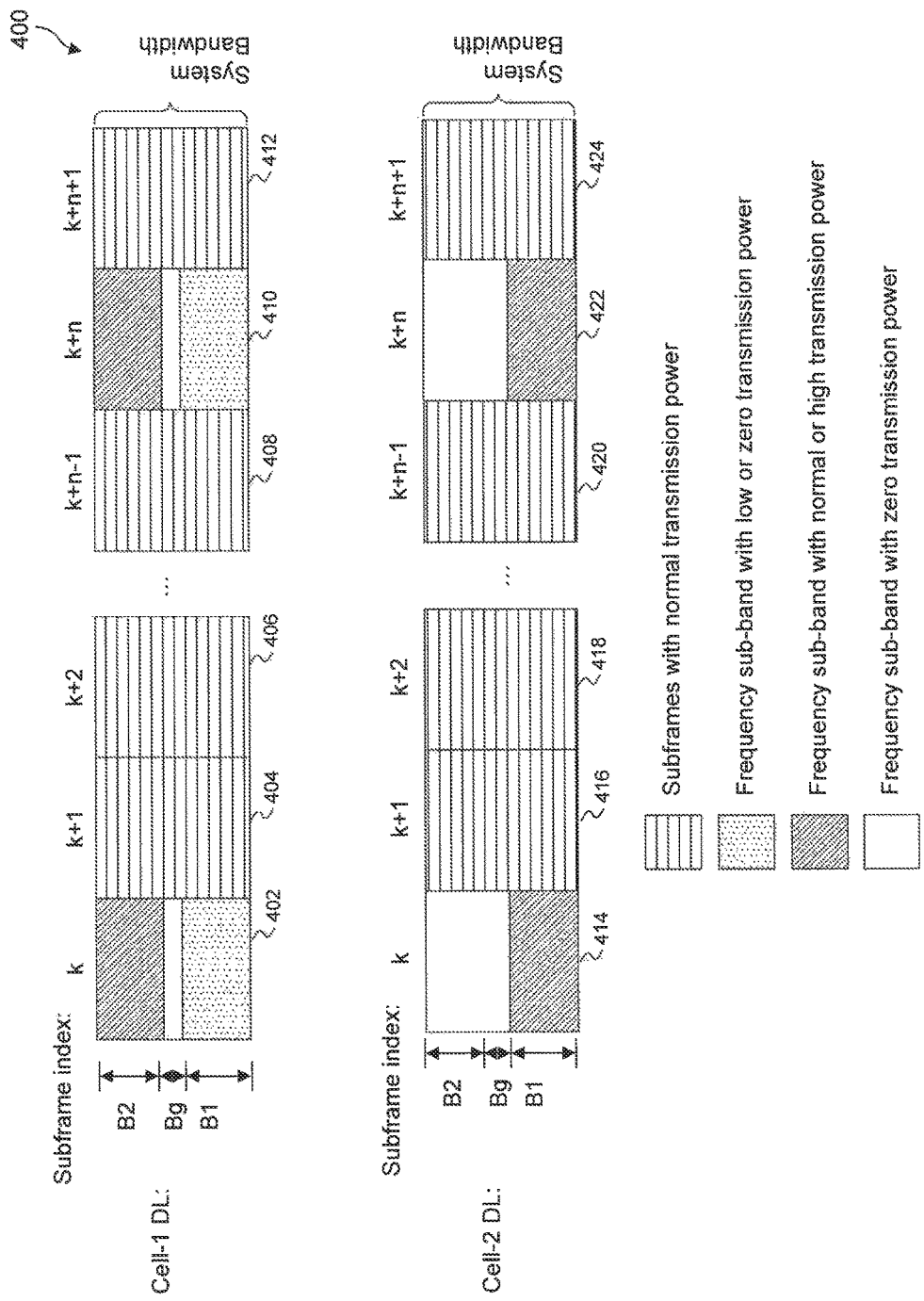
FIG. 4 is a block diagram used to explain a method for applying band-limited subframes in a wireless network, in accordance with an embodiment of the present disclosure.

FIG. 4 is a diagram used to explain an example method 400 for applying band-limited subframes in a wireless network, in accordance with an embodiment of the present disclosure. As shown in FIG. 4, downlink (DL) subframes 402 and 410 are configured to be band-limited subframes of cell-1, and correspondingly, DL subframes 414 and 422 are configured to be band-limited subframes of cell-2. The remaining DL subframes 404, 406, 408, 412, 416, 418, 420, and 424 are configured to be regular subframes with normal transmission power. In the band-limited subframes, the system bandwidth may be partitioned into multiple portions, each portion with different cell transmission power. For example, in the top portion denoted by $B_2$, cell-1 eNB transmits with normal or high power, and in the lower portion of the bandwidth denoted by $B_1$, cell-1 eNB transmits with low power or zero power. In some implementations, the transmission power of cell-1 eNB over frequency sub-band $B_2$ may be configured to be higher than a first pre-determined threshold, and the transmission power of cell-1 eNB over frequency sub-band $B_1$ may be configured to be lower than a second pre-determined threshold. The second threshold may be configured to be lower than the first threshold. Correspondingly, cell-2 eNB transmits with normal or high transmission power over $B_1$, and refrains from transmitting data to UEs over $B_2$ as strong interference is expected from cell-1 eNB over $B_1$. In some implementations, the transmission power of cell-2 eNB over frequency sub-band $B_1$ may be configured to be higher than a first pre-determined threshold, and the transmission power of cell-2 eNB over frequency sub-band $B_2$ may be configured to be lower than a second pre-determined threshold. The second threshold may be configured to be lower than the first threshold. In some implementations, cell-1 may be a macro cell, a small cell, or a small cell cluster head, and cell-2 may be a small cell.

By using the band-limited subframes at cell-1 eNB, cell-2 eNB may transmit with normal or high power over $B_1$ with reduced interference from cell-1 eNB during these subframes, while cell-1 eNB may still be able to transmit data to UEs over $B_2$ during these subframes. Compared with the almost blank subframe (ABS) adopted in LTE, where cell-1 blanks its data transmission over the entire system bandwidth during the ABS, the band-limited subframes allow cell-1 to maintain normal or high transmission power over certain frequency sub-band while cell-2 enjoys low interference transmission over other frequency sub-band.

Note that due to power imbalance and different arrival timing, a small cell UE receiving signals in sub-band $B_1$ may experience interference leaked from signals in subband $B_2$ from cell-1 when the received signal in subband $B_2$ is much higher than the received signal in subband $B_1$. The leakage could be the result of non-orthogonality between signals in the two sub-bands due to a few factors such as non-perfect frequency and timing synchronization between the two eNBs, Doppler frequency shift, filtering at UE and eNBs, and UE receiving timing error. To avoid this interference, a guard band, as denoted by $B_g$ in FIG. 4, may be used. Each of cell-1 and cell-2 blanks its data transmission over the guard band $B_g$. The size of $B_g$ can be determined such that it may ease or prevent the power leakage from the high-power transmission sub-band into the low-power transmission sub-band. In scenarios with low or no power-leakage, $B_g$ may be removed and the associated bandwidth can be added to sub-band $B_1$ or $B_2$. The guard band may be configured semi-statically by either of cell-1 or cell-2.

In some implementations, cell-2 eNB may avoid scheduling the cell edge UEs or cell range expansion (CRE) UEs in those resource blocks that could experience high interference from cell-1. For instance, cell-2 eNB may avoid scheduling its UEs in the CRE region in sub-band $B_2$ of the band-limited subframes in cell-1. Moreover, cell-2 eNB can borrow the power from sub-band $B_2$ to use on the sub-band $B_1$ while keeping the total transmit power within the maximum allowed transmit power. As explained, to eliminate any power leakage from $B_2$ region, cell-2 eNB may not transmit on guard band $B_g$ and only transmits over $B_1$ region. In some implementations, alternative to a fixed guard band, cell-2 eNB may take the possible interference into account when allocating resources to a UE in sub-band $B_1$. For example, cell-2 eNB may dynamically decide not to allocate the resource blocks in sub-band $B_1$ which are located adjacent to sub-band $B_2$. The number of resource blocks may be either estimated by the cell-2 eNB or based on UE's measurement feedback.

Figure 5:
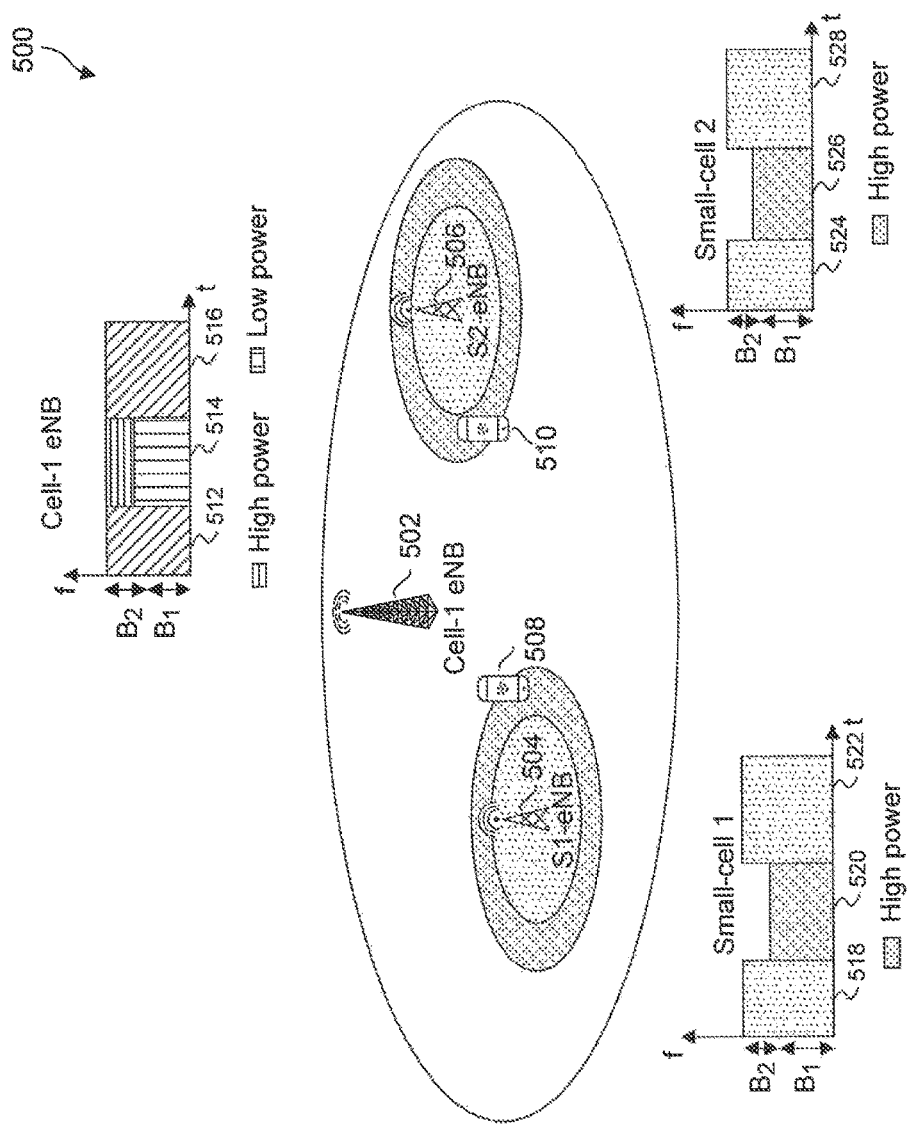
FIG. 5 illustrates an example implementation of band-limited subframes in a wireless network, in accordance with an embodiment of the present disclosure.

FIG. 5 illustrates an example implementation 500 of band-limited subframes in a wireless network, in accordance with an embodiment of the present disclosure. In FIG. 5, cell-1 eNB 502 may be an overlay macro cell or a small cell cluster head, and small-cell 1 eNB 504 and small-cell 2 eNB 506 are deployed within the macro cell coverage. Subframe 514 is configured to be a band-limited subframe of cell-1 with low transmission power on frequency sub-band $B_1$ and with normal or high transmission power on frequency sub-band $B_2$. Subframes 512 and 516 are configured to be normal subframes with normal or high transmission powers in cell-1. For simplicity of the representation, the guard band is not shown in FIG. 5 as a separate region, and it may be inserted if interference leakage is severe.

As shown in FIG. 5, small-cell 1 eNB 504 transmits to UE 508, which is located at the small-cell 1 range expansion area, over sub-band $B_1$ of subframe 520 with normal or high transmission power. Subframe 520 of small-cell 1 coincides with the band-limited subframe 514 of cell-1. Small-cell 1 blanks its transmission to UEs located at cell range expansion area over frequency sub-band $B_2$ of subframe 520 because of the high interference from cell-1. Small-cell 1 may transmit to UEs located at cell center during regular subframes 518 and 522. Since small-cell 1 and small-cell 2 are well separated and do not cause much interference over each other, small-cell 2 may transmit to UE 510 (which is located at the small-cell 2 range expansion area) over the same portion of the system bandwidth $B_1$ of subframe 526 (which coincides with the band-limited subframe 514 of cell-1). In doing so, the wireless network can enjoy the benefits of spatial frequency reuse. Similar to small-cell 1, small-cell 2 also blanks its transmission to UEs located at cell range expansion area over frequency sub-band $B_2$ of subframe 526 because of the high interference from cell-1. Small-cell 2 may transmit to UEs located at cell center during regular subframes 524 and 528.

Figure 6:
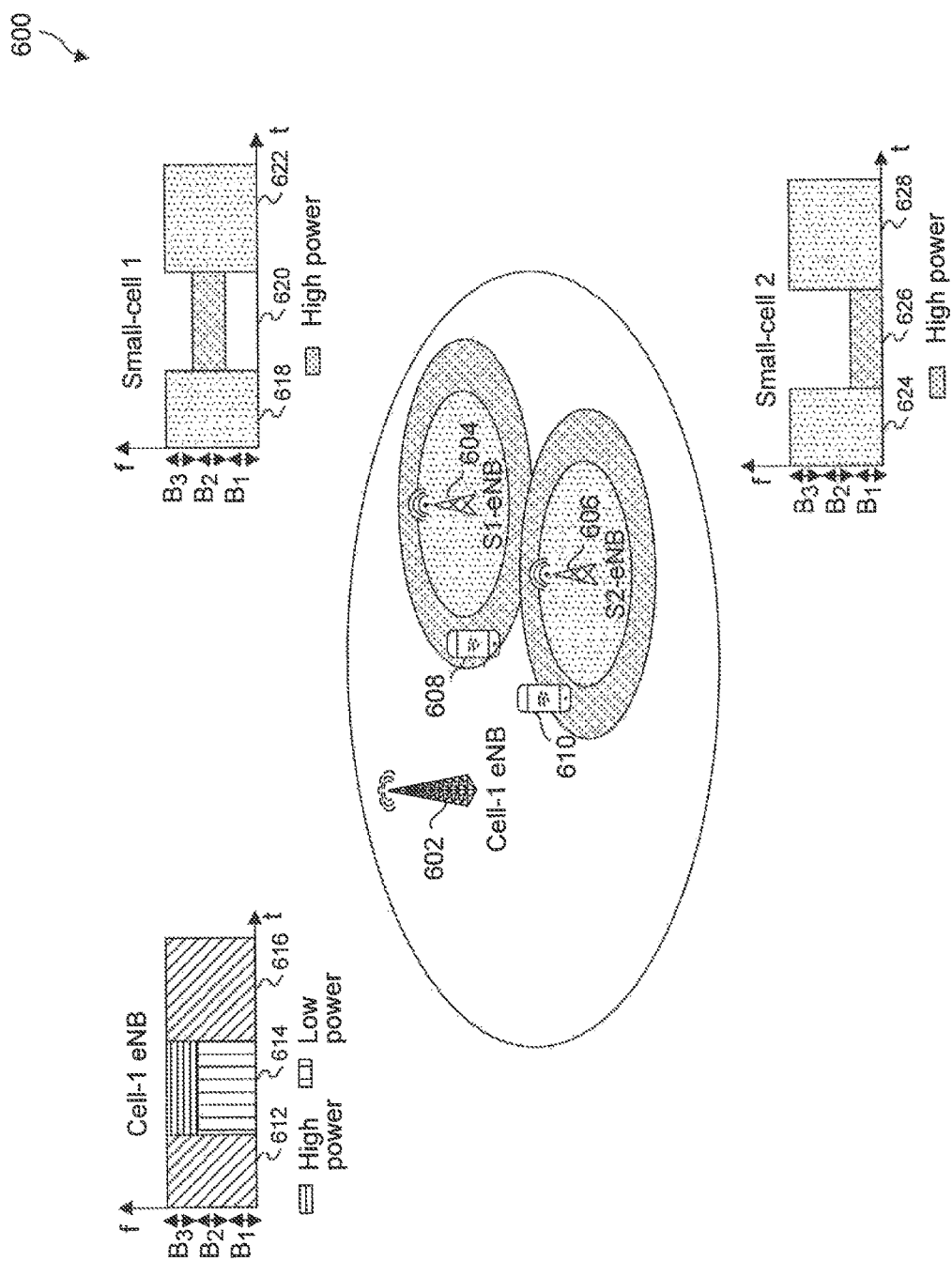
FIG. 6 illustrates another example implementation of band-limited subframes in a wireless network, in accordance with an embodiment of the present disclosure.

FIG. 6 illustrates another example implementation 600 of band-limited subframes in a wireless network, in accordance with an embodiment of the present disclosure. In FIG. 6, cell-1 eNB 602 may be an overlay macro cell or a small cell cluster head, and small-cell 1 eNB 604 and small-cell 2 eNB 606 are deployed within the macro cell coverage. Small-cell 1 eNB 604 and small-cell eNB 606 are close to each other, and have some overlapping coverage. Subframe 614 is configured to be a band-limited subframe of cell-1 with low transmission power on frequency sub-band $B_1$ and $B_2$, and with normal or high transmission power on frequency sub-band $B_3$. Subframes 612 and 616 are configured to be normal subframes with normal or high transmission powers in cell-1. For simplicity of the representation, the guard band is not shown in FIG. 6 as a separate region, and it may be inserted if interference leakage is severe.

As shown in FIG. 6, small-cell 1 eNB 604 transmits to UE 608, which is located at the small-cell 1 range expansion area, over sub-band $B_2$ of subframe 620 with normal or high transmission power. Subframe 620 of small-cell 1 coincides with the band-limited subframe 614 of cell-1. Small-cell 1 blanks its transmission to UEs located at cell range expansion area over frequency sub-band $B_3$ of subframe 620 because of the high interference from cell-1. In addition, small-cell 1 blanks its transmission to UEs located at cell range expansion area over frequency sub-band $B_1$ of subframe 620. Small-cell 1 may transmit to UEs located at cell center during regular subframes 618 and 622. Small-cell 2 may transmit to UE 610, which is located at the small-cell 2 range expansion area, over frequency sub-band $B_1$ of subframe 626, which coincides with the band-limited subframe 614 of cell-1. Similar to small-cell 1, small-cell 2 also blanks its transmission to UEs located at cell range expansion area over frequency sub-band $B_3$ of subframe 626 because of the high interference from cell-1. In addition, small-cell 2 blanks its transmission to UEs located at cell range expansion area over frequency sub-band $B_2$ of subframe 620. Small-cell 2 may transmit to UEs located at cell center during regular subframes 624 and 628.

As the small-cells are close to each other and have overlapping coverage, different portions of bandwidth cell-1 are configured for them to transmit to UEs near the cell range expansion area, for example, $B_2$ for small-cell 1 and $B_1$ for small-cell 2. The frequency sub-band $B_1$ and $B_2$ may be configured by cell-1, which is a macro cell or small-cell cluster head. Note that in this example the configured bandwidth portion to each small-cell is less compared with the sub-band configuration shown in FIG. 5. On the other hand, since each small cell eNB can still transmit with its maximum power in its allocated bandwidth, the power density per resource element (RE) in this example can be more than that of the configuration in FIG. 5.

The band-limited transmission may be only applied to the data region, for example, physical downlink shared channel (PDSCH) region, of a subframes if physical control channel, for example, physical downlink control channel (PDCCH) is still supported in the cell. If PDCCH is not supported in the cell, band-limited transmission could be applied to the entire subframe, including the orthogonal frequency division multiplexing (OFDM) symbols that are normally configured for PDCCH.

Figure 7:
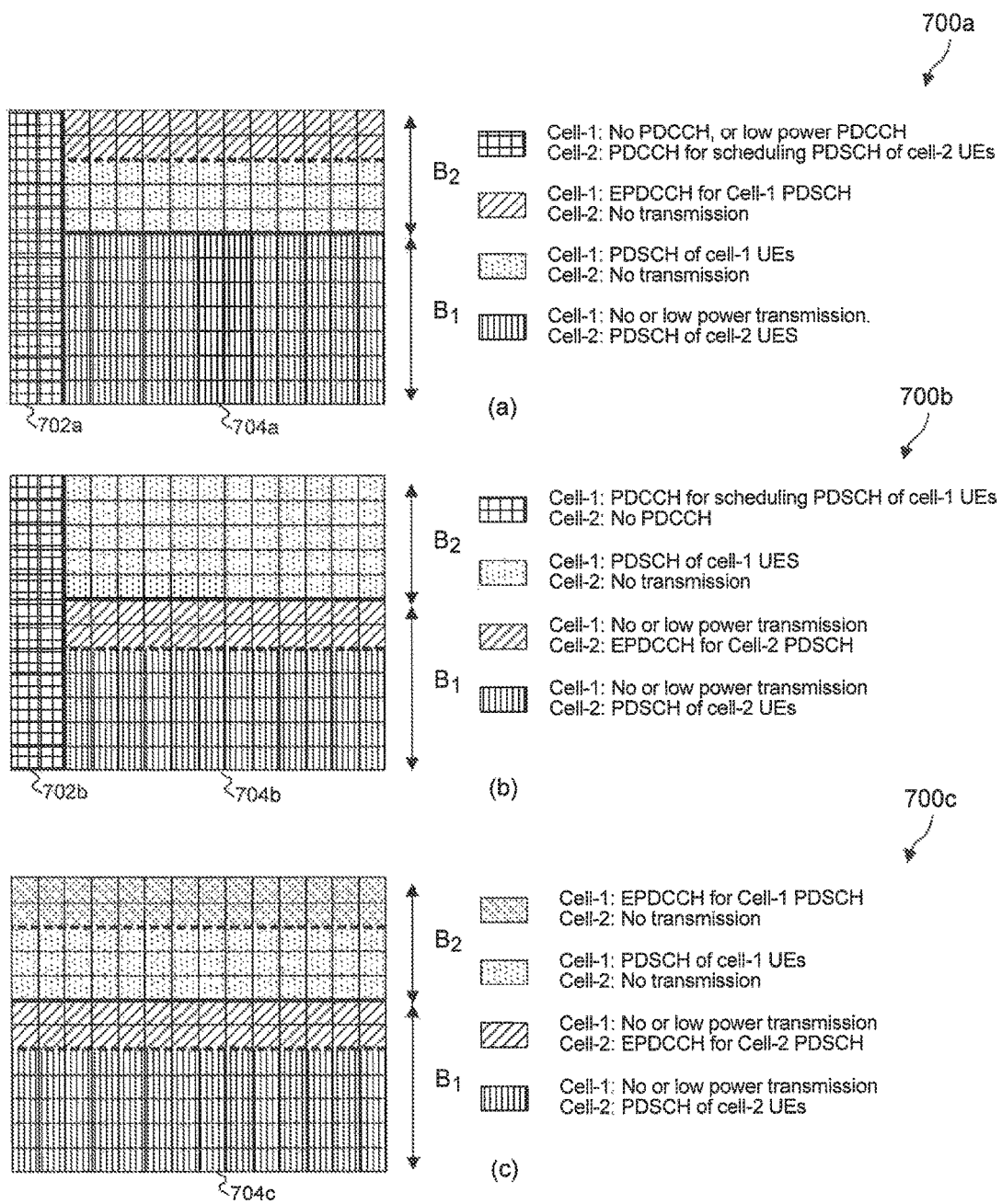
FIG. 7(a) illustrates an example control channel configuration in a band-limited subframe, in accordance with an embodiment of the present disclosure.
FIG. 7(b) illustrates another example control channel configuration in a band-limited subframe, in accordance with an embodiment of the present disclosure.
FIG. 7(c) illustrates yet another example control channel configuration in a band-limited subframe, in accordance with an embodiment of the present disclosure

FIG. 7 is divided into three parts (a), (b), and (c), each illustrating an example control channel configuration. FIG. 7(a) illustrates an example control channel configuration 700a in a band-limited subframe, in accordance with an embodiment of the present disclosure. In FIG. 7(a) the first two OFDM symbols constitute PDCCH region 702a of the subframe, where cell-2 transmits control information for downlink grant or uplink grant in this region. On the other hand, cell-1 mutes its PDCCH transmission or transmits at a low power in the region 702a to avoid interference to cell-2. Cell-1 may be a macro cell or small cell cluster head, and cell-2 may be a small cell in this example.

The remaining OFDM symbols in the subframe constitute the PDSCH region 704a of the subframe. In the PDSCH region 704a, cell-2 transmits to its cell range expansion users over frequency sub-band $B_1$, while cell-1 mutes its transmission or transmits at a low power over frequency sub-band B. Cell-1 transmits at a normal or high power over frequency sub-band $B_2$, while cell-2 mutes its transmission over frequency sub-band $B_2$. Moreover, since cell-1 does not transmit control information in the PDCCH region 702a, cell-1 transmits the control information in the PDSCH region in portion of the frequency sub-band $B_2$. In some implementations, enhanced PDCCH (E-PDCCH) techniques may be employed for transmitting the control information in the PDSCH region. Cell-1 may transmit data information in the remaining portion of the frequency sub-band $B_2$. It should be understood that the number of OFDM symbols contained in the PDCCH region and PDSCH region may vary without departing from the scope of the present disclosure.

The starting OFDM symbol for the E-PDCCH and PDSCH in the band-limited subframe of the cell-1 can be signaled to the UE by higher layer semi-statically. This information may also be signaled to the neighbour cell eNBs, for example, cell-2, along with the band-limited ABS pattern. Subsequently, cell-2 may set the number of OFDM symbols for PDCCH in the band-limited ABS subframes according to the received information. Cell-1 may configure the starting OFDM symbol for E-PDCCH based, in part, on the number of OFDM symbols in the PDCCH region needed in cell-2.

In some implementations, cell-1 may schedule its advanced UEs during the band-limited ABS using the E-PDCCH techniques, and schedule legacy-UEs during the normal subframes. In this example control channel configuration, cell-2 is able to schedule either legacy UE or advanced UE during the band-limited subframe.

FIG. 7(b) illustrates another example control channel configuration 700b in a band-limited subframe, in accordance with an embodiment of the present disclosure. In FIG. 7(b), the first two OFDM symbols constitute PDCCH region 702b of the subframe, where cell-1 transmits control information for downlink or uplink grant in this region. On the other hand, cell-2 mutes its PDCCH transmission in the PDCCH region 702b because of the interference generated from cell-1. Cell-1 may be a macro cell or small cell cluster head, and cell-2 may be a small cell in this example.

The remaining OFDM symbols in the subframe constitute the PDSCH region 704b of the subframe. In the PDSCH region 704b, cell-2 transmits to its cell range expansion users over frequency sub-band $B_1$, while cell-1 mutes its transmission or transmits at a low power over frequency sub-band $B_1$. Cell-1 transmits data information in the PDSCH region 704b at a normal or high power over frequency sub-band $B_2$, while cell-2 mutes its transmission over frequency sub-band $B_2$. Moreover, since cell-2 does not transmit control information in the PDCCH region 702b, cell-2 transmits the control information in the PDSCH region in portion of the frequency sub-band $B_1$. In some implementations, E-PDCCH techniques may be employed for transmitting the control information in the PDSCH region. Cell-2 may transmit data information in the remaining portion of the frequency sub-band $B_1$. By transmitting the control information in the PDSCH region 704b, the control channel interference, that is, the PDCCH interference to cell-1, is reduced. The starting symbol of E-PDCCH may be signaled to a UE semi-statically through higher layer signaling, or dynamically through physical control format indicator channel (PCFICH). It should be understood that the number of OFDM symbols contained in the PDCCH region and PDSCH region may vary without departing from the scope of the present disclosure. In some implementations, cell-2 may schedule advanced UEs during the band-limited subframe based on this example control channel configuration.

FIG. 7(c) illustrates yet another example control channel configuration 700c in a band-limited subframe, in accordance with an embodiment of the present disclosure. In this example, there is no PDCCH region in the subframe and the entire subframe constitutes PDSCH region of the subframe 704c. Control information is transmitted in the PDSCH region 704c for both cell-1 and cell-2. In the entire subframe, cell-2 transmits to its cell range expansion users over frequency sub-band $B_1$, while cell-1 mutes its transmission or transmits at a low power over frequency sub-band $B_1$. Cell-1 transmits at a normal or high power over frequency sub-band $B_2$, while cell-2 mutes its transmission over frequency sub-band $B_2$. Cell-1 may be a macro cell or small cell cluster head, and cell-2 may be a small cell in this example.

There is also no PDCCH region in the subframe. Cell-1 transmits the control information in the PDSCH region in portion of the frequency sub-band $B_2$. Similarly, cell-2 transmits the control information in the PDSCH region in portion of the frequency sub-band $B_1$. In some implementations, E-PDCCH techniques may be employed for transmitting the control information in the PDSCH region. Cell-1 may transmit data information in the remaining portion of the frequency sub-band $B_2$, and cell-2 may transmit data information in the remaining portion of the frequency sub-band $B_1$. It should be understood that the number of OFDM symbols contained in the band-limited subframe may vary without departing from the scope of the present disclosure. It should also be understood that the control channel configuration illustrated in FIGS. 7(a), 7(b), and 7(c) may be used alone or in any combination in a wireless system without departing from the scope of the present disclosure.

In some implementations, the macro cell eNB may exclude the subframes containing primary synchronization signal (PSS), secondary synchronization signal (SSS), and physical broadcast channel (PBCH) from the list of subframes candidates considered for band-limited subframes. In some implementations, if band-limited subframes are used to carry either PSS, SSS, and PBCH, the macro cell eNB may exclude the frequency sub-bands or resource blocks containing one or more of these signals from the list of sub-bands or resource blocks candidates considered for low power transmission.

Furthermore, with the application of band-limited subframe, more flexible PDSCH power boosting may be reached by moving power from RBs with low transmit power to those with high transmit power. The ratio of the PDSCH transmit power with respect to common reference signal (CRS) transmit power, $\rho_A$, may need to be modified, for example, by increasing the maximum value to greater than 3 dB. In some implementations, another ratio $\rho_A$ specific to PDSCH transmission in band-limited subframes may be defined and signalled to the UE being scheduled in the band-limited subframes.

As the macro cell and small cell reduces transmission power in part of the system bandwidth during the band-limited subframes, UEs in these cells experience different level of interference during the band-limited subframe from during the normal or almost blank subframes measurement procedures, including radio link measurement (RLM), radio resource management (RRM), and channel state information (CSI) may be adjusted with the application of the band-limited subframes.

Figure 8:
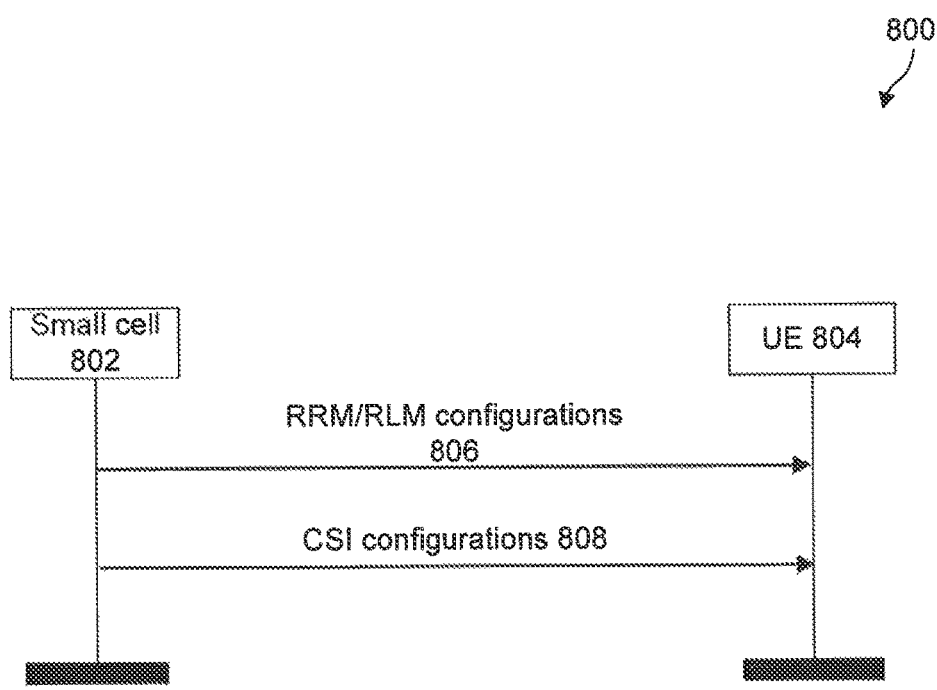
FIG. 8 illustrates an example signaling block diagram for user equipment measurement configuration in a wireless network, in accordance with an embodiment of the present disclosure.

FIG. 8 illustrates an example signaling block diagram 800 for user equipment measurement configuration in a wireless network, in accordance with an embodiment of the present disclosure. As shown in FIG. 8, the small cell 802 may send RRM/RLM configurations 806 and CSI configurations 808 to UE 804. The RRM/RLM configurations 806 and CSI configurations 808 may reflect the configuration of band-limited subframes. Subsequently, UE 804 may perform measurements based on the received RRM/RLM configurations and CSI configurations.

Figure 9:
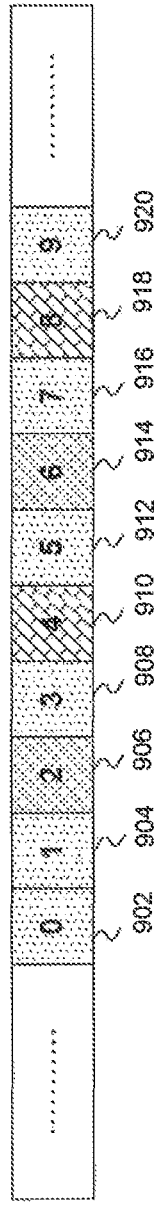
FIG. 9 illustrates an example radio frame structure, in accordance with an embodiment of the present disclosure.

FIG. 9 illustrates an example radio frame structure 900 with different measurement sets, in accordance with an embodiment of the present disclosure. A radio frame includes a plurality of subframes, for example, subframes 902-920 as shown in this example. Among the 10 subframes, subframe 902, 904, 908, 912, 916, and 920 are configured to be normal subframes, during which the cell transmits with normal transmission power across the system bandwidth. Subframes 906 and 914 are configured to be almost blank subframes, during which the cell blanks its transmission or transmits at a low power over the entire system bandwidth of the PDSCH region. Subframes 910 and 918 are configured to be band-limited subframes, during which the cell the cell blanks its transmission or transmits at a low power over a portion of the system bandwidth of the PDSCH region.

Based on the different types of subframes, UE measurements can be divided into multiple sets. For example, one set of measurements may be performed on the ABS subframes. A second set of measurements may be performed on the band-limited subframes. A third set of measurements may be performed on the normal subframes.

Depending on the configurations of the higher layers, for each type of subframes, the UE may report multiple measurements for different frequency sub-band or report one measurement for the entire system bandwidth. Higher layer signaling such as RRC signaling could be used to indicate the set of subframes that correspond to the band-limited subframes in the macro cell. For example, information element measSubframePattern can be used to indicate the subset of subframes that the macro cell uses for band-limited subframes. Additionally, within each measurement subframe, the UE might be configured to follow sub-band channel quality indicator (CQI) reporting procedure, where the UE reports separate channel conditions for different sub-bands (e.g., low-power transmission band, high-power transmission band, and guard band). The reported CQI may be used at the small cell eNB for future scheduling of the UE and for adjusting the size of the required guard band region.

Figure 10:
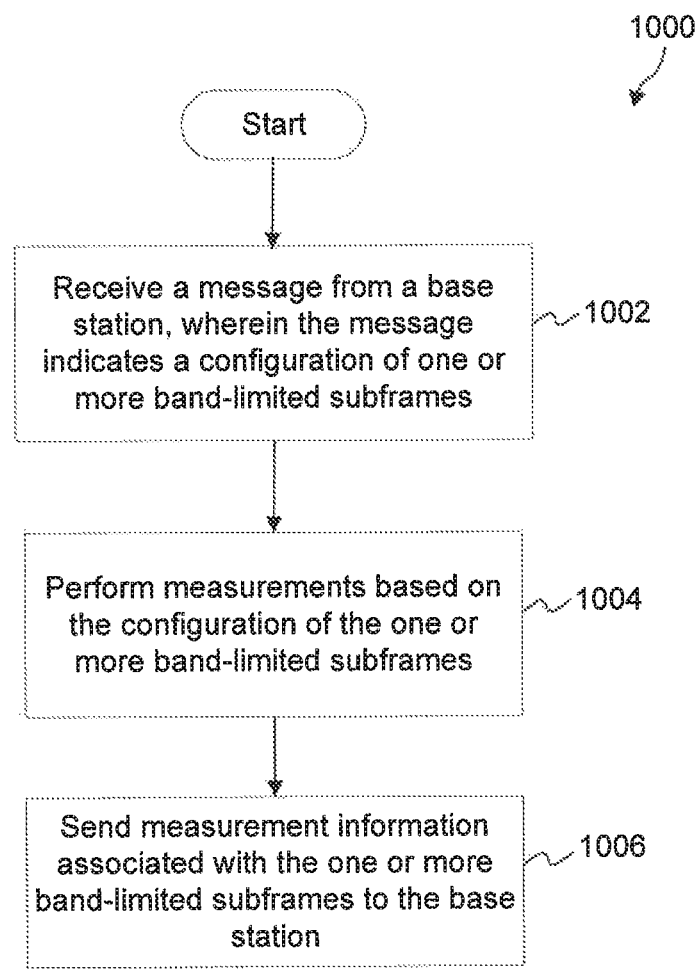
FIG. 10 is a flow chart of an example method for performing measurement by a user equipment, in accordance with an embodiment of the present disclosure.

FIG. 10 illustrates a flow chart 1000 of an example method for performing measurement by a user equipment, in accordance with an embodiment of the present disclosure. At step 1002 the UE receives a message from a base station, wherein the message indicates a configuration of one or more band-limited subframes. The base station may be a small cell base station, for example, a pico cell base station. The message may be received in a RRC message. The message may also indicate information of the high power frequency sub-band and/or low power frequency sub-band over the band-limited subframes. In some implementations, the message may also indicate a configuration of almost blank subframes.

At 1004 the UE performs measurements based on the configuration of the one or more band-limited subframes. For example, the UE may measure the received signal power or received signal to noise ratio over the entire system bandwidth, or over the high power or low power frequency sub-band. The UE may also measure sub-band channel quality information (CQI) associated with the one or more band-limited subframes.

At 1006 the UE sends measurement information associated with the one or more band-limited subframes to the base station. Subsequently, the UE may receive data, downlink grant, or uplink grant from the base station during one of the one or more band-limited subframes.

To schedule the UEs over the band-limited subframes, the small cell eNB may need to know the configurations of the band-limited subframes and the high power and low power frequency sub-bands. In some implementations, the macro cell eNB may send the configurations of the band-limited subframes to the small cell eNB over the backhaul link.

Figure 11:
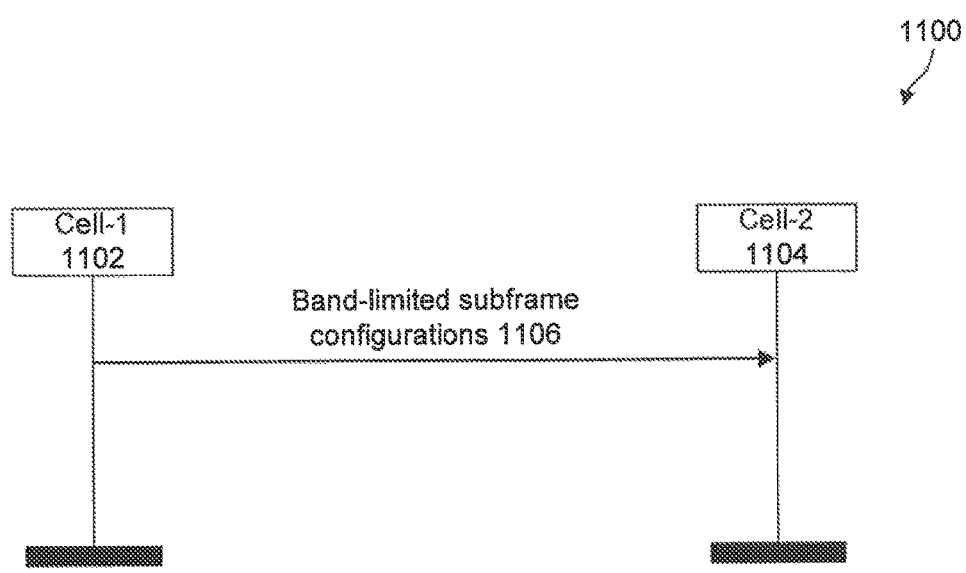
FIG. 11 illustrates an example signaling block diagram for band-limited subframe configuration in a wireless network, in accordance with an embodiment of the present disclosure.

FIG. 11 illustrates an example signaling block diagram 1100 for band-limited subframe configuration in a wireless network, in accordance with an embodiment of the present disclosure. As shown in FIG. 11, cell-1 1102 may send configurations of the band-limited subframes 1106 to cell-2 1104. In this example, cell-1 may be a macro cell or a small cell cluster head, and cell-2 may be a small cell. The configurations of the band-limited subframes, for example, the frequency sub-band and the subframe index of the band-limited subframes, may be set semi-statically. That is, after the configurations of the band-limited subframes are set, the configurations remain the same until another message changing the configurations is received.

In some implementations, a load Information message may be sent among eNBs over an X2 interface to indicate the configurations of the band-limited subframes. For example, the relative narrowband transmission power (RNTP) information element (IE) may be used to indicate the configurations of the band-limited subframes. In one embodiment, the load Information message from 3GPP Technical Specification (TS) 36.423 may be modified in accordance with Table 1 below to include the band-limited subframe configurations. In particular, "$ABS_{BL}$ Information" IE and "$RNTP_{BL-ABS}$" IE may be added to indicate the band-limited subframe configurations.

TABLE 1

Example of load information message contains configuration for band-limited subframes

| IE/Group Name | Presence | Range | Semantics description | Criticality | Assigned Criticality |
|---|---|---|---|---|---|
| Message Type | M | | | YES | ignore |
| Cell Information | M | | | YES | ignore |
| >Cell Information Item | | 1 ... <maxCellineNB> | | EACH | ignore |
| >>Cell ID | M | | Id of the source cell | — | — |
| >>UL Interference Overload Indication | O | | | — | — |
| >>UL High Interference Information | | 0 ... <maxCellineNB> | | — | — |
| >>>Target Cell ID | M | | Id of the cell for which the HII is meant | — | — |
| >>>UL High Interference Indication | M | | | — | — |
| >>Relative Narrowband Tx Power (RNTP) | O | | | — | — |
| >>ABS Information | O | | | YES | ignore |
| >>Relative Narrowband Tx Power for band-limited ABS ($RNTP_{BL-BS}$) | O | | | — | — |
| >>$ABS_{BL}$ Information | O | | | YES | ignore |
| >>Invoke Indication | O | | | YES | ignore |

The $ABS_{BL}$ Information IE in Table 1 carries information regarding the configuration of band-limited ABS subframes of cell-1. The $RNTP_{BL-ABS}$ IE indicates sub-band transmission power of the band-limited subframe. These two IE may be signal together to form a complete configuration of band-limited subframes.

An example of the $RNTP_{BL-ABS}$ IE is shown in Table 2, where $RNTP_{BL-BS}$ per physical resource block (PRB) is a bit map, and $RNTP_{BL-BS}$ Threshold is a threshold for band-limited subframes. An example value for $RNTP_{BL-BS}$ may be defined as:

$RNTP_{BL-ABS,threshold} \in \{-\infty,-13,-12,-11,-10,-9,-8,-7,-6,-5,-4,-3,-2,-1,0,+1\}$.

TABLE 2

Example $RNTP_{BL-ABS}$ IE

| IE/Group Name | Presence | Range | IE type and reference | Semantics description | Criticality | Assigned Criticality |
|---|---|---|---|---|---|---|
| $RNTP_{BL-ABS}$ Per PRB | M | | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 Value 0 indicates "Tx not exceeding $RNTP_{BL-BS}$ Threshold". Value 1 indicates "no promise on the Tx power is given" | — | — |
| $RNTP_{BL-ABS}$ Threshold | M | | ENUMERATED | | — | — |

Note that the "$RNTP_{BL-ABS}$ Per PRB" IE is necessary if the bit string for $RNTP_{BL-ABS}$ is different from the bit string for normal subframes. If the same power constraint is applied to the same set of PRBs, then the "$RNTP_{ABS}$ Per PRB" field may not be included. This has the benefit of reducing overhead size.

In one embodiment, the text of 3GPP TS 36.213 may be modified in accordance with Table 2 above to include the $RNTP_{BL-ABS}$ IE. An example text proposal for 3GPP TS 36.213 is illustrated in Table 3.

TABLE 3

Text proposal for 3GPP TS 36.213

The determination of reported Relative Narrowband TX Power indication $RNTP_{BL-ABS}(n_{PRB})$ is defined as follows:

$$RNTP_{BL-ABS}(n_{PRB}) = \begin{cases} 0 \text{ if } \frac{E_A(n_{PRB})}{E_{max\_nom}^{(p)}} \leq RNTP_{BL-ABS,threshold} \\ 1 \text{ if no promise about the upper limit of } \frac{E_A(n_{PRB})}{E_{max\_nom}^{(p)}} \text{ is made} \end{cases}$$

where $E_A(n_{PRB})$ is the maximum intended EPRE of UE-specific PDSCH REs in OFDM symbols not containing RS in this physical resource block on antenna port p in the considered future time interval, $n_{PRB}$ is the physical resource block number $n_{PRB} = 0, \ldots, N_{RB}^{DL} - 1$; $RNTP_{BL-ABS,threshold}$ takes on one of the following values $RNTP_{BL-ABS,threshold} \in \{-\infty, -13, -12, -11, -10, -9, -8, -7, -6, -5, -4, -3, -2, -1, 0, +1\}$[dB] and TABLE 3-continued Text proposal for 3GPP TS 36.213

$$E_{max\_nom}^{(p)} = \frac{P_{max}^{(p)} \cdot \frac{1}{\Delta f}}{N_{RB}^{DL} \cdot N_{SC}^{RB}}$$

where $P_{max}^{(p)}$ is the base station maximum output power described in 3GPP TS 36.104, and $\Delta f$, $N_{RB}^{DL}$ and $N_{SC}^{RB}$ are defined in 3GPP TS 36.211.

The systems and methods described above may be implemented by any hardware, software or a combination of hardware and software having the above described functions. The software code, either in its entirety or a part thereof, may be stored in a computer readable memory.

The example implementation of FIGS. 7 and 10 may be implemented using coded instructions (e.g., computer-readable instructions) stored on a tangible computer-readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of 500, 700, and 900 may be implemented using coded instructions (e.g., computer-readable instructions) stored on a non-transitory computer-readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/ or for caching of the information). As used herein, the term non-transitory computer-readable medium is expressly defined to include any type of computer-readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of a first network node, comprising:
    providing, in one or more radio frames, a set of subframes comprising a band-limited subframe having a system bandwidth, wherein the system bandwidth of the band-limited subframe is partitioned into a first frequency sub-band, a second frequency sub-band, and a third frequency sub-band, the first frequency sub-band, the second frequency sub-band, and the third frequency sub-band are in a same frequency band, and the third frequency sub-band is located between the first frequency sub-band and the second frequency sub-band;
    for the band-limited subframe:
        transmitting over the first frequency sub-band of the band-limited subframe, with a first transmission power;
        transmitting over the second frequency sub-band of the band-limited subframe, with a second transmission power, wherein the first transmission power is above a first threshold, the second transmission power is below a second threshold, and the second threshold is lower than the first threshold; and
        refraining from transmitting over the third frequency sub-band of the band-limited subframe; and
    sending at least one of information of the set of subframes, information of the first frequency sub-band, or information of the second frequency sub-band, to a user equipment.

2. The method of claim 1, further comprising sending information of the set of subframes to a second network node.

3. The method of claim 2, further comprising sending information of at least one of the first and the second frequency sub-bands to the second network node, wherein the information indicates the second threshold.

4. The method of claim 3, wherein the first network node sends the information of the set of subframes and the information of the first and second frequency sub-bands in a Load Information message to the second network node.

5. The method of claim 2, wherein the second network node refrains from transmitting data over the first frequency sub-band during the set of subframes.

6. The method of claim 2, wherein the second network node transmits with low power over the first frequency sub-band during the set of subframes.

7. The method of claim 2, wherein the second network node transmits with normal or high power over the second frequency sub-band during the set of subframes.

8. The method of claim 2, wherein the first network node is a macro cell network node and the second network node is a small cell network node.

9. The method of claim 2, wherein the first network node and the second network node are both small cell network nodes.

10. The method of claim 1, wherein the first network node transmits control information in a physical downlink shared channel (PDSCH) region of the first frequency sub-band during the set of subframes.

11. The method of claim 1, further comprising sending at least one of information of the set of subframes, information of the first frequency sub-band, and information of the second frequency sub-band, to a user equipment.

12. A method of a user equipment (UE), comprising:
    receiving a message from a network node, wherein the message indicates a configuration of a set of subframes comprising a band-limited subframe having a system bandwidth wherein the system bandwidth of the band-limited subframe is partitioned into a first frequency sub-band, a second frequency sub-band, and a third frequency sub-band, the first frequency sub-band, the second frequency sub-band, and the third frequency sub-band are in a same frequency band, and the third frequency sub-band is located between the first frequency sub-band and the second frequency sub-band, and wherein for the band-limited subframe:
        the network node transmits over the first frequency sub-band of the band-limited subframe with a first transmission power,
        transmits over the second frequency sub-band of the band-limited subframe with a second transmission power, and
        refrains from transmitting over the third frequency sub-band of the band-limited subframe, wherein the first transmission power is above a first threshold, the second transmission power is below a second threshold, and the second threshold is lower than the first threshold;
    performing measurements based on the configuration of the set of subframes; and
    sending measurement information associated with the set of subframes to the network node.

13. The method of claim 12, wherein the message further indicates information of the first and second frequency sub-bands.

14. The method of claim 12, wherein the UE receives the message in a radio resource control (RRC) message.

15. The method of claim 12, further comprising sending channel quality information (CQI) associated with a plurality of frequency sub-bands within the set of subframes to the network node.

16. The method of claim 12, wherein the measurement information includes a plurality of measurements associated with a plurality of frequency sub-bands.

17. The method of claim 12, wherein the measurement information includes a single measurement associated with an entire frequency band.

18. The method of claim 12, further comprising receiving data from the network node during at least one subframe of the set of subframes.

19. The method of claim 18, wherein the UE receives control information associated with the data in a physical downlink shared channel (PDSCH) region.

20. A network node, comprising:
a memory; and
at least one hardware processor communicatively coupled with the memory and configured to:
provide, in one or more radio frames, a set of subframes comprising a band-limited subframe having a system bandwidth, wherein the system bandwidth of the band-limited subframe is partitioned into a first frequency sub-band, a second frequency sub-band, and a third frequency sub-band, the first frequency sub-band, the second frequency sub-band, and the third frequency sub-band are in a same frequency band, and the third frequency sub-band is located between the first frequency sub-band and the second frequency sub-band; and
for the band-limited subframe:
transmit over the first frequency sub-band of the band-limited subframe, with a first transmission power;
transmit over the second frequency sub-band of the band-limited subframe, with a second transmission power, wherein the first transmission power is above a first threshold, the second transmission power is below a second threshold, and the second threshold is lower than the first threshold; and
refrain from transmitting over the third frequency sub-band of the band-limited subframe; and
send at least one of information of the set of subframes, information of the first frequency sub-band, or information of the second frequency sub-band, to a user equipment.

21. A user equipment, comprising:
a memory; and
at least one hardware processor communicatively coupled with the memory and configured to:
receive a message from a network node, wherein the message indicates a configuration of a set of subframes comprising a band-limited subframe having a system bandwidth wherein the system bandwidth of the band-limited subframe is partitioned into a first frequency sub-band, a second frequency sub-band, and a third frequency sub-band, the first frequency sub-band, the second frequency sub-band, and the third frequency sub-band are in a same frequency band, and the third frequency sub-band is located between the first frequency sub-band and the second frequency sub-band, and wherein for the band-limited subframe:
the network node transmits over the first frequency sub-band of the band-limited subframe with a first transmission power,
transmits over the second frequency sub-band of the band-limited subframe with a second transmission power, and
refrains from transmitting over the third frequency sub-band of the band-limited subframe, wherein the first transmission power is above a first threshold, the second transmission power is below a second threshold, and the second threshold is lower than the first threshold;
perform measurements based on the configuration of the set of subframes; and
send measurement information associated with the set of subframes to the network node.

* * * * *